(12) United States Patent
Zhang et al.

(10) Patent No.: US 6,476,803 B1
(45) Date of Patent: Nov. 5, 2002

(54) OBJECT MODELING SYSTEM AND PROCESS EMPLOYING NOISE ELIMINATION AND ROBUST SURFACE EXTRACTION TECHNIQUES

(75) Inventors: Zhengyou Zhang, Redmond; Charles Loop, Seattle; Ying Shan, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/479,408

(22) Filed: Jan. 6, 2000

(51) Int. Cl.⁷ .............................................. G06T 17/00
(52) U.S. Cl. ...................... 345/419; 345/420; 345/582
(58) Field of Search ................................ 345/418, 419, 345/420, 423, 424, 426, 427, 428, 581, 582, 583

(56) References Cited

U.S. PATENT DOCUMENTS

| 6,100,893 | A | * | 8/2000 | Ensz et al. .................. 345/420 |
| 6,271,847 | B1 | * | 8/2001 | Shum et al. ................. 345/582 |
| 6,326,964 | B1 | * | 12/2001 | Snyder et al. ............... 345/419 |
| 6,331,116 | B1 | * | 12/2001 | Kaufman et al. ........... 345/418 |
| 6,348,918 | B1 | * | 2/2002 | Szeliski et al. ............. 345/419 |

OTHER PUBLICATIONS

B. Curless and M. Levoy. A volumetric method for building complex models from range images. In Compute Graphics (SIGGRAPH'96 Proceedings), pp. 303–312, 1996.

H. Hoppe. Surface reconstruction from unorganized points. In Compute Graphics (SIGGRAPH'92 Proceedings), pp. 71–78, Jul. 1992.

H. Samet. The design and analysis of spatial data structures. Addison Wesley, Reading, MA, 1990.

Z. Zhang. Iterative point matching for registration of free-form curves and surfaces. The International Journal of ComputerVision, 13(2):119–152, 1994.

* cited by examiner

*Primary Examiner*—Cliff N. Vo
(74) *Attorney, Agent, or Firm*—Lyon & Harr, LLP; Richard T. Lyon

(57) ABSTRACT

A system and process for computer modeling of an object involving first capturing images of the object that collectively depict all the object's surfaces which are to be modeled. A series of 3D reconstructions are then derived from the images. Each of the reconstructions represent a portion of the object's surfaces. Noise elimination techniques are employed to reduce the number of extraneous reconstruction points. The individual 3D reconstructions are then registered to a common coordinate system to produce an overall 3D reconstruction of the object's surfaces. A surface representation of the object is extracted from the overall 3D reconstruction using robust surface extraction techniques, and if desired, a texture map for the surface representation of the object can be computed using the previously captured images to produce a photorealistic model of the object.

21 Claims, 11 Drawing Sheets (1 of 11 Drawing Sheet(s) Filed in Color)

OBJECT MODELING SYSTEM AND PROCESS EMPLOYING NOISE ELIMINATION AND ROBUST SURFACE EXTRACTION TECHNIQUES

BACKGROUND

1. Technical Field

The invention is related to a computer-implemented object modeling system and process, and more particularly to such a system and process that employs noise elimination and robust surface extraction techniques.

2. Background Art

Computer modeling of natural or manmade objects from images has found a wide range of applications. For example, an electronic catalogue of products for Internet advertisement, or the visualization of museum objects on the Internet. The object could even be a human face, and the applications include talking heads and games, and very low bandwidth video conferencing on Internet.

There are several considerations in deciding what system to employ to accomplish the aforementioned object modeling. First, there are the image collection costs. Many object modeling applications do not lend themselves to elaborated camera setups or customized fixtures for holding the object, as is needed with many of today's object modeling systems for capturing the needed images of the object being modeled. The cost and difficulty in positioning the camera and/or the object are simply to great in many cases to make the modeling practical. It would be much more desirable that so-called casual images be used and that the object modeling system be capable of using such images. Casual images of an object are those that can be captured without having to control the camera's position or orientation, and which do not require costly object-holding fixtures. One particularly attractive way of capturing casual images of an object is with a desktop digital camera. Desktop-type digital cameras are becoming cheap and ubiquitous, and so would be an excellent choice for capturing the images needed to model an object at minimum cost.

Another consideration in selecting an object modeling system is the data storage requirements of the system. If the storage requirements are extensive, the cost of the system's memory could become prohibitive. In addition, if large amounts of data must be handled, the object modeling will not be suitable for remote presentation, such as on the web.

Lastly, the complexity of the object modeling system should be considered. For example, if the processing requirements of the system are overly complex, then the time required to model an object may become excessive. In addition, special computing hardware may be needed, thereby driving up the cost of the system. Further, if the system requires a great deal of user interaction in the modeling process, it may be too daunting for many too learn and use the system.

The current object modeling techniques can be roughly divided into two categories. The first category uses a 3D model-based representation. In this category, a CAD-like model is built, which is very concise. However, it is extremely difficult to obtain an accurate model because of imperfections in system calibration, uncertainty in feature extraction, and errors in image matching. In addition, these techniques often need to acquire and store a large number of images, and the collection cost is high because the camera's pose must be memorized for each image taken. The other category involves an image-based representations. In this category, one needs to acquire and store nearly all images necessary for subsequent visualization. Therefore, visualization of an object model is essentially a redisplay of images, yielding photorealistic results. However, a major drawback of this technique is that it requires all images be stored for future rendering, thus requiring a great deal of system memory.

Given the foregoing considerations, it is clear there is a need for an improved object modeling system and process.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention involves a new object modeling system and process that allows easy image capture, requires only a small amount of data storage, and constructs the desired model efficiently. The system and process first acquires images of an object that is to be modeled. These images can be captured in a variety of ways, but regardless of the procedure employed, the images should collectively depict every surface of the object that it is desired to model. One possible procedure for capturing the needed images of the object would be to use a stereo camera rig and obtain stereo images of the object (e.g., using a trinocular stereo system). Another, more standard, method would be to capture a series of 2D images of the object being modeled. One particularly attractive procedure for obtaining the 2D images is to capture the aforementioned casual images of the object. As explained previously, casual images are those that can be captured without having to control the camera's position or orientation, and which do not require costly camera equipment or object-holding fixtures.

The images of the object, regardless of how they were captured, are employed in the next phase of the object modeling process to compute a series of 3D reconstructions of the object. The reason for initially computing multiple 3D reconstructions from the images is to ensure every surface of the object being modeled is represented by some part of a reconstruction and to allow for significant overlap in the reconstructions to increase the accuracy of the modeling process. It is also preferred that a multiframe stereo reconstruction process be employed to increase the accuracy of the reconstructions. To this end, a small group of consecutive images (e.g., 5 frames) could be used to produce each reconstruction. There are many existing methods that can be used to compute the 3D reconstructions, any of which could be employed as desired. For example, if the acquired images are individual 2D views of the object, a standard feature point tracking and structure-from-motion approach could be used to produce the desired 3D reconstructions. It is noted that these standard reconstruction approaches using 2D images typically require that the intrinsic parameters associated with the camera used to capture the images be computed. Alternately, if the acquired images are captured using a stereo rig, such as for example a trinocular stereo system, the 3D reconstructions could be generated via a conventional 3D registration procedure.

Regardless of how the 3D reconstructions are obtained, it is preferred that the reconstruction data be processed to eliminate noise effects before proceeding to the next phase of the object modeling process. This is especially desirable where stereo matching techniques have been used to generate the reconstructions as they tend to be noisy. One preferred noise elimination procedure is "automatic clustering". This method begins by calculating the mean and then the variance of the points in the point cloud in each orthogonal direction. A threshold is then applied in each direction to define a cuboid-shaped bounding box. Any point lying outside the bounding box is eliminated.

The procedure is repeated until there is no longer any significant change in the mean and variance between iterations. While the automatic clustering method is good at eliminating extraneous reconstruction points outside the defined bounding boxes, it does nothing to eliminate extraneous points within the box, such as might exist in voids or holes associated with the object. A "3D spatial filtering" procedure can be used to remove such points from the reconstruction data. The 3D spatial filtering begins by dividing a 3D space containing all the reconstruction points into voxels. To minimize processing, an octree scheme [3] is employed resulting in only voxels containing reconstruction points being considered. For each point, the voxel containing the point is identified along with a prescribed number of its neighboring voxels. All the points contained in the voxel block are counted, and if the total number of points exceeds a prescribed threshold, then the point remains in the reconstruction data. Otherwise, the point is eliminated.

Once the noise elimination processing is complete, the various individual 3D reconstructions are merged into one overall 3D reconstruction of the object via a standard registration process. This registration is required because the images used to compute the individual 3D reconstructions would have been captured at a different orientations in relation to the object. Thus, the coordinate frames of each group may be different, and so to create an overall 3D reconstruction, the point sets associated with each of the individual reconstructions have to be aligned to a common coordinate frame.

The next phase of the object modeling process involves a surface extraction procedure designed to define the surface of the object based on the points associated with the previously-computed overall 3D reconstruction. One preferred procedure for accomplishing this task begins by dividing a 3D space containing all the reconstruction points associated with the overall 3D reconstruction into voxels using an octree approach so that only those voxels containing at least on reconstruction point are identified. Each voxel in turn undergoes a "signed distance computation" to define a plane which best represents the surface of the object in that voxel. Specifically, the signed distance computation begins by identifying a "neighborhood" of voxels associated with the voxel under consideration. For the purposes of the present object modeling process, a fixed neighborhood size was used—for example, a 3 by 3 by 3 voxel block as used in tested embodiments of the present invention. All the points contained within the identified voxels neighborhood are used to calculate a plane that represents the surface of the object contained within the voxel under consideration. This procedure is then repeated for all the voxel containing reconstruction points.

Preferably, the plane for each voxel is defined by a normal thereof extending from the plane to a prescribed one of the vertices of the voxel under consideration. This normal is preferably established by first computing the centroid of all points in the previously identified voxel neighborhood. A covariance matrix is then computed and the eigenvector corresponding to the smallest eigenvalue of the covariance matrix is designated as vector of the normal of the plane, but without initially specifying which of the two possible directions that the vector is directed. The distance from the plane to the prescribed vertex along the normal is also calculated to establish the magnitude of the normal vector. The direction of the normal for each voxel is preferably established by first identifying the direction from each point in the voxel under consideration to the optical center associated with the camera used to capture the original image from which the point was derived. This is repeated for each of the other voxels in the previously identified voxel neighborhood associated with the voxel under consideration. The vector from a reconstruction point to its associated optical center is referred to as the visibility vector. It is next determined whether the angle between the normal computed for each voxel in a voxel neighborhood and the visibility vector for each point contained in that voxel is less than 90 degrees by a prescribed threshold amount, greater than 90 degrees by the prescribed threshold amount, or within the prescribed threshold amount of 90 degrees. The normal vector of a voxel under consideration would be assigned a positive direction (i.e., toward the prescribed vertex) if a majority of the angles between the visibility vectors and associated normals were less than 90 degrees by the threshold amount, and assigned a negative direction (i.e., away from the prescribed vertex) when the majority of the angles are greater than 90 degrees by the threshold amount. However, there can be regions of an object's surface where the plane normal of a voxel is almost perpendicular to most of the visibility vectors associated with the points contained in the voxel. If this occurs there is some ambiguity as to whether the normal points in the positive or negative direction. Thus, if the majority of the of the angles between the visibility vectors and associated normals were found to be within the prescribed threshold amount of 90 degrees, then the undetermined direction status is maintained for the normal of the voxel under consideration.

Once the foregoing procedure has been performed for all the voxels containing reconstruction points, the direction of the normal of any voxels still having an undetermined normal direction status is preferably determined by a back propagation procedure. The back propagation procedure begins by selecting a voxel that was marked as having a plane normal with an undetermined direction, and identifying which of the directly adjacent neighboring voxels has the largest absolute value for the cross product of the normal vector associated with the currently selected voxel and the normal vector associated with the neighboring voxel. If the so identified neighboring voxel has a previously determined direction for its plane normal, then the same direction is assigned to the plane normal of the "undetermined" voxel. However, if the identified neighboring voxel also has a plane normal with an undetermined direction, then the identified neighboring voxel becomes the currently selected voxel and the process is repeated until a voxel with a determined normal direction is encountered or a prescribed propagation limit is reached. In the case where a voxel having a determined normal direction is reached within the propagation limits, the direction associated with that voxel's normal is assigned to all the "undetermined" voxels traversed on the way to the "determined" voxel. If the prescribed propagation limit is reached before encountering a voxel having a determined direction, then the undetermined normal direction status of the currently selected voxel, and that of any "undetermined" voxels that were traversed on the way to the currently selected voxel, are retained.

Once the back propagation procedure is complete, it is preferred that an additional check be made to ensure the derived normal directions are realistic and to establish a normal direction for any remaining "undetermined" voxels. This entails imposing a local consistency check where, for each voxel, the signs of the normals associated with the voxels in a prescribed voxel neighborhood associated with the voxel are identified, and if the voxel under consideration has a sign that is inconsistent with the majority of the neighborhood, or has an undetermined sign, it is changed to match the majority.

A modified marching cubes approach, which employs the just-computed normal vector data, is then used to extract a triangle-mesh representation from the implicit surface of the object defined by the planes computed for each voxel. The standard marching cubes procedure is used, however, it is modified to incorporate an octree-based approach. In the traditional marching cubes method, a voxel is selected (i.e., the seed cube) that contains a portion of the surface of the object. The triangle mesh representation of the surface is then constructed by, inter alia, identifying a neighboring voxel containing a part of the surface and "marching" voxel by voxel until surface is analyzed. However, if the object being modeled is made up of multiple, separated sections, then the traditional method will miss disjointed portions of the object not containing the surface component of the seed cube. In the modified procedure, this problem is resolved as follows. Any one of the previously defined voxels containing reconstruction points is selected. The triangle-mesh surface representation is then computed by proceeding as in the traditional marching cubes method, with the exception the an accounting of each voxel processed is kept. When all the voxels containing a section of the surface of the portion of the object associated with the initially selected voxel have been processed, it is determined if any unprocessed voxels exist (as would be the case if the object is made up of disjointed surfaces). Whenever, it is determined that un-processed voxels exist, the foregoing procedure is repeated until no more un-processed voxels remain. In this way every voxel containing reconstruction points is processed and so every surface making up the object will be modeled.

Finally, once the surface extraction procedure is complete, it is possible to also perform a texture mapping process to create a photorealistic model of the image. One preferred way of accomplishing this texture mapping is as follows. For each of the triangular areas of the object's surface defined in the surface extraction procedure, the portions of the original images that depict that particular triangular area are identified. These areas are then blended to create a composited representation of the area. Finally, this composited representation is assigned as the texture for the selected area.

In addition to the just described benefits, other advantages of the present invention will become apparent from the detailed description which follows hereinafter when taken in conjunction with the drawing figures which accompany it.

The file of this patent contains at least one drawing executed in color. Copies of this patent with color drawing(s) will be provided by the U.S. Patent and Trademark Office upon request and payment of the necessary fee.

DESCRIPTION OF THE DRAWINGS

The file of this patent contains at least one drawing executed in color. Copies of this patent with color drawing(s) will be provided by the Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
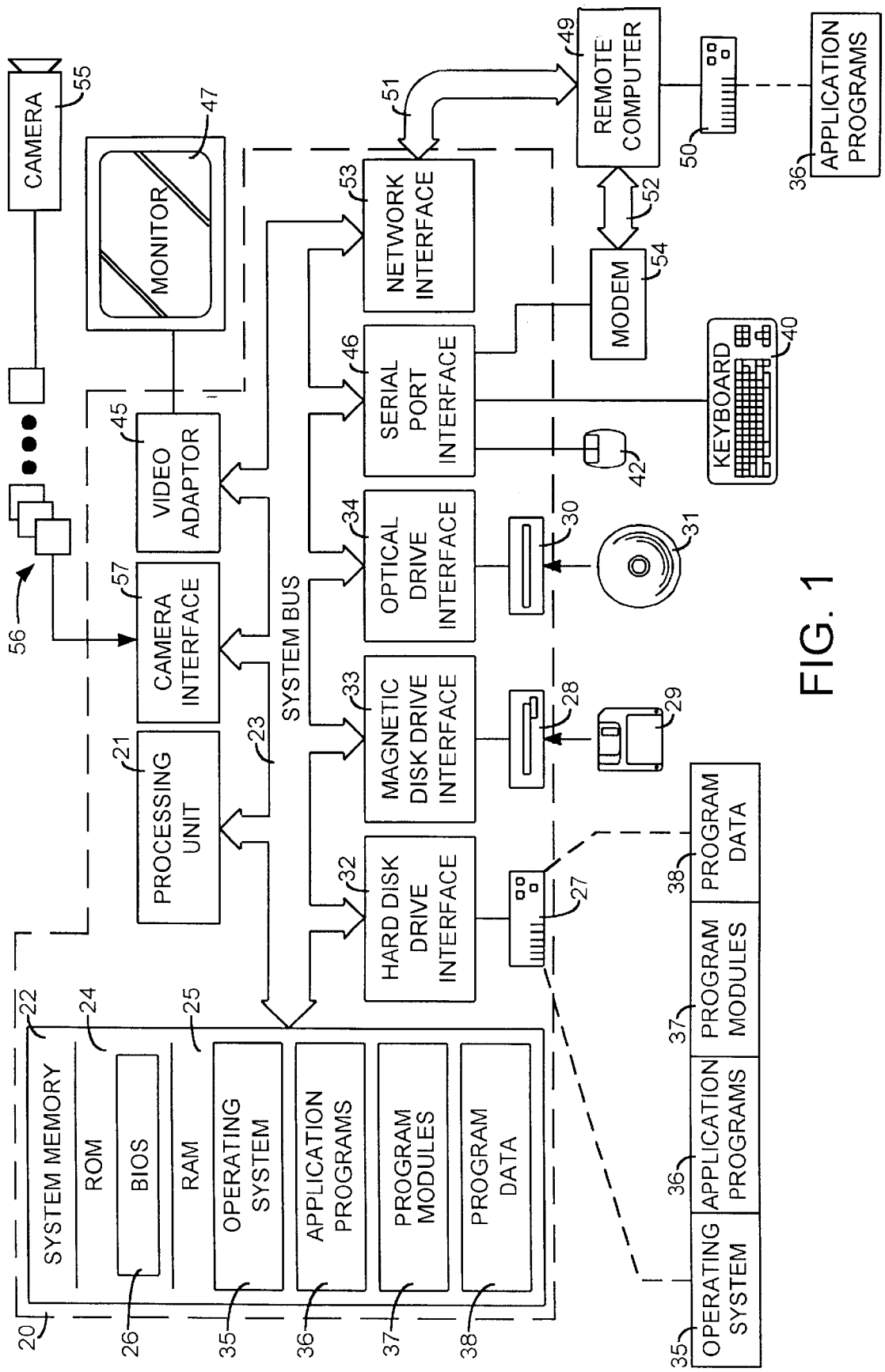
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide 10 nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
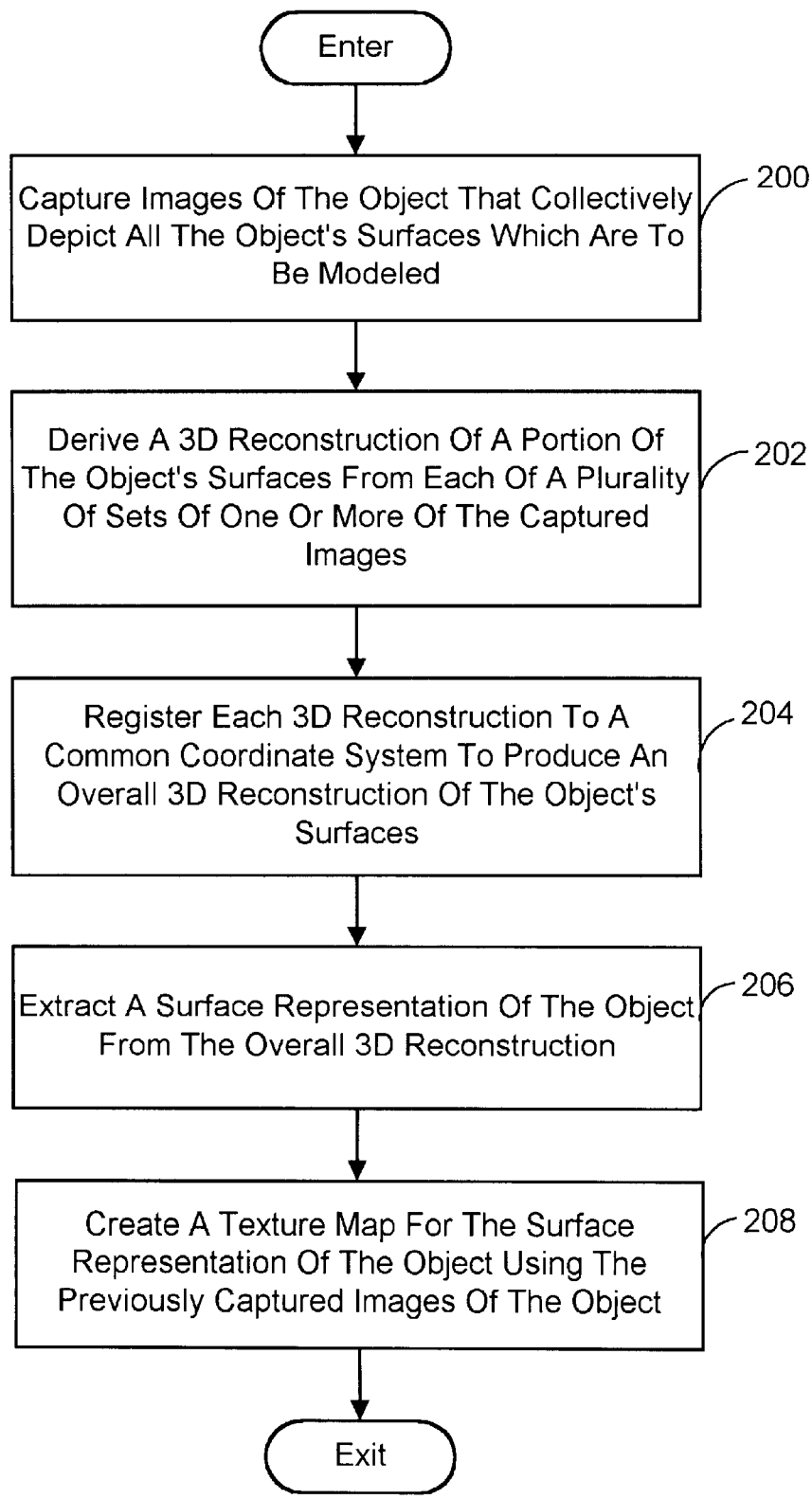
FIG. 2 is a flow chart diagramming an overall process for modeling an object according to the present invention.

The exemplary operating environment having now been discussed, the remaining part of this description section will be devoted to a description of the program modules embodying the invention. The present invention involves a system and process for modeling an object using one of the aforementioned computing devices. In general, this modeling is accomplished via the following process actions, as shown in the high-level flow diagram of FIG. 2:

a) capturing images of the object that collectively depict all the object's surfaces which are to be modeled (process action 200);

b) deriving a 3D reconstruction of a portion of the object's surfaces from each of a plurality of sets of one or more of the captured images (process action 202);

c) registering each 3D reconstruction to a common coordinate system to produce an overall 3D reconstruction of the object's surfaces (process action 204);

d) extracting a surface representation of the object from the overall 3D reconstruction (process action 206); and e) creating a texture map for the surface representation of the object using the previously captured images of the object (process action 208).

A description of each of the foregoing processes actions, as well as experimental results associated with tested embodiments of the system and process will be provided in the sections that follow.

1.0 Capturing Images Of The Object

The modeling process begins by acquiring images of an object that is to be modeled. The images captured should collectively depict every surface of the object that it is desired to model. This can be accomplished in a variety of ways. For example, one method would be to employ a stereo camera rig and obtain stereo images of the object (e.g., using a trinocular stereo system). While this method of obtaining the images can be advantageous as it simplifies the next phase of the operation where a 3D reconstruction of the depicted object is computed, it also requires a relatively expensive and complex camera setup. Another way to obtain the images needed to extract the reconstruction data is to capture a series of 2D images of the object being modeled. The camera setup to accomplish this task is simpler, but as part of this image acquisition procedure, the intrinsic parameters associated with the camera used must also be computed. The intrinsic parameters are needed in order to extract metric information from 2D images for the upcoming 3D reconstruction procedure.

If a series of 2D images of the object are employed to obtain the needed metric information, the cameras intrinsic parameters can be computed using a camera calibration procedure. Much work has been done, starting in the photogrammetry community, and more recently in computer vision, in regard to camera calibration. Most of the existing techniques can be roughly classified into two categories: photogrammetric calibration and self-calibration. In photogrammetric calibration techniques, camera calibration is performed by observing a calibration object whose geometry in 3D space is known with high precision. The calibration object usually consists of two or three planes orthogonal to each other. Sometimes, a plane undergoing a precisely known translation is also used. However, these approaches require a relatively expensive calibration apparatus, and an elaborate setup. Techniques in the self-calibration category do not use any calibration object. Just by moving a camera in a static scene, the rigidity of the scene provides two constraints on the cameras' internal parameters from one camera displacement by using image information alone. Therefore, if images are taken by the same camera with fixed internal parameters, correspondences between three images are sufficient to recover both the internal and external parameters which allow the 3D structure to be reconstructed up to a similarity transform. While this approach is very flexible, it is not yet mature enough for practical use. In addition, there are many parameters to estimate and so the results are not always reliable.

While any of these existing camera calibration processes can be employed to accomplish the task of ascertaining the camera parameters, one particular method could be employed which avoids the problems described above in connection with the existing procedures. This method involves using a desktop video camera to capture casual images of the object to be modeled by either moving the camera around the stationary object, or moving the object around in front of the stationary camera, and is the subject of a co-pending patent application entitled METHOD AND SYSTEM FOR CALIBRATING DIGITAL CAMERAS having a common inventor with the present application and assigned to a common assignee. This co-pending application was filed on Apr. 30, 1999, and assigned Ser. No. 09/303,340. The disclosure of the co-pending application is hereby incorporated by reference. The aforementioned camera calibration method will not only make it possible to compute the needed camera parameters, but as an added benefit allows the use of inexpensive camera equipment and casual images of the object. It will be remembered that a casual image is one that is captured without having to control the camera's position or orientation, and which does not require costly camera equipment or object-holding fixtures. One particularly attractive way of capturing casual images of an object is with a desktop digital camera. Thus, the complex camera setups associated with some existing calibration methods are avoided.

The camera calibration procedure associated with the aforementioned method involves having the camera observe a planar pattern in at least two different orientations. Either the camera or the planar pattern can be moved by hand and the motion need not be known. However, as the mode in which the object is moved is technically more challenging because the appearance of the object can change with position, it is preferred that the camera be moved around the stationary object for the purposes of the present invention. Each image of the planar pattern determines a plane projective mapping (defined by a so-called 3×3 homography matrix) between the model plane and the image plane. The homography matrix provides two constraints on the camera intrinsic parameters. Therefore, three images of the model pattern from different orientations (or two if the pixels are assumed to be rectangular, i.e., no skew) suffice to determine the camera intrinsic parameters needed for the 3D reconstruction phase of the present object modeling process to be discussed shortly. Both computer simulation and real data have been used to test the proposed camera calibration technique, and very good results have been obtained. Compared with classical photogrammetric calibration techniques, the proposed technique is considerably more flexible, and compared with self-calibration, it exhibits a considerably higher degree of robustness.

2.0 Computing 3D Reconstructions of the Object.

The next phase of the present object modeling process involves computing a 3D reconstruction of the object of interest from the previously acquired images. Since the object being modeled is three dimensional, no one image can depict all sides of the object. Thus, multiple 3D reconstructions will have to be derived from images and then merged to create an overall reconstruction of the object. It is also preferred that the 3D reconstructions overlap significantly thereby allowing for an increase accuracy in the merging procedure owing to the redundancy in the various reconstructions. In addition, it is preferred that a multiframe stereo reconstruction process be employed to increase the accuracy of the results. Accordingly, a small group of consecutive images (e.g., 5 frames) could be used to produce each reconstruction. These images can be readily obtained using a desktop video camera. Therefore, an overall 3D reconstruction of the object can be obtained by first computing a series of 3D reconstructions from each group of consecutively captured images of the object's surfaces, and then merged. There are many existing methods for accomplishing the 3D reconstructions, any of which could be employed as desired. For example, if the acquired images are individual 2D views of the object, a standard feature point tracking and structure-from-motion approach could be used to produce the desired 3D reconstructions. Alternately, if the acquired images are captured using a stereo rig, such as for example a trinocular stereo system, the 3D reconstructions could be generated via a conventional 3D registration procedure.

Regardless of how the 3D reconstructions are obtained, it is preferred that the reconstruction data be processed to eliminate noise effects before proceeding to the next phase of the object modeling process. This is especially desirable where stereo matching techniques have been used to generate the reconstructions as they tend to be noisy.

2.1 Eliminating Noise Effects.

The reconstructed 3D points contain potentially significant noise because of imperfections inherent in stereo matching. The uncertainty in 3D position is different from one point to another. Furthermore, the data is collected from different positions, so it can have several inconsistent uncertainty measures even for the same physical point, making 3D registration problematic. Therefore, a noise elimination stage is desirable to alleviate these difficulties and ensure accurate reconstructions.

Figure 3:
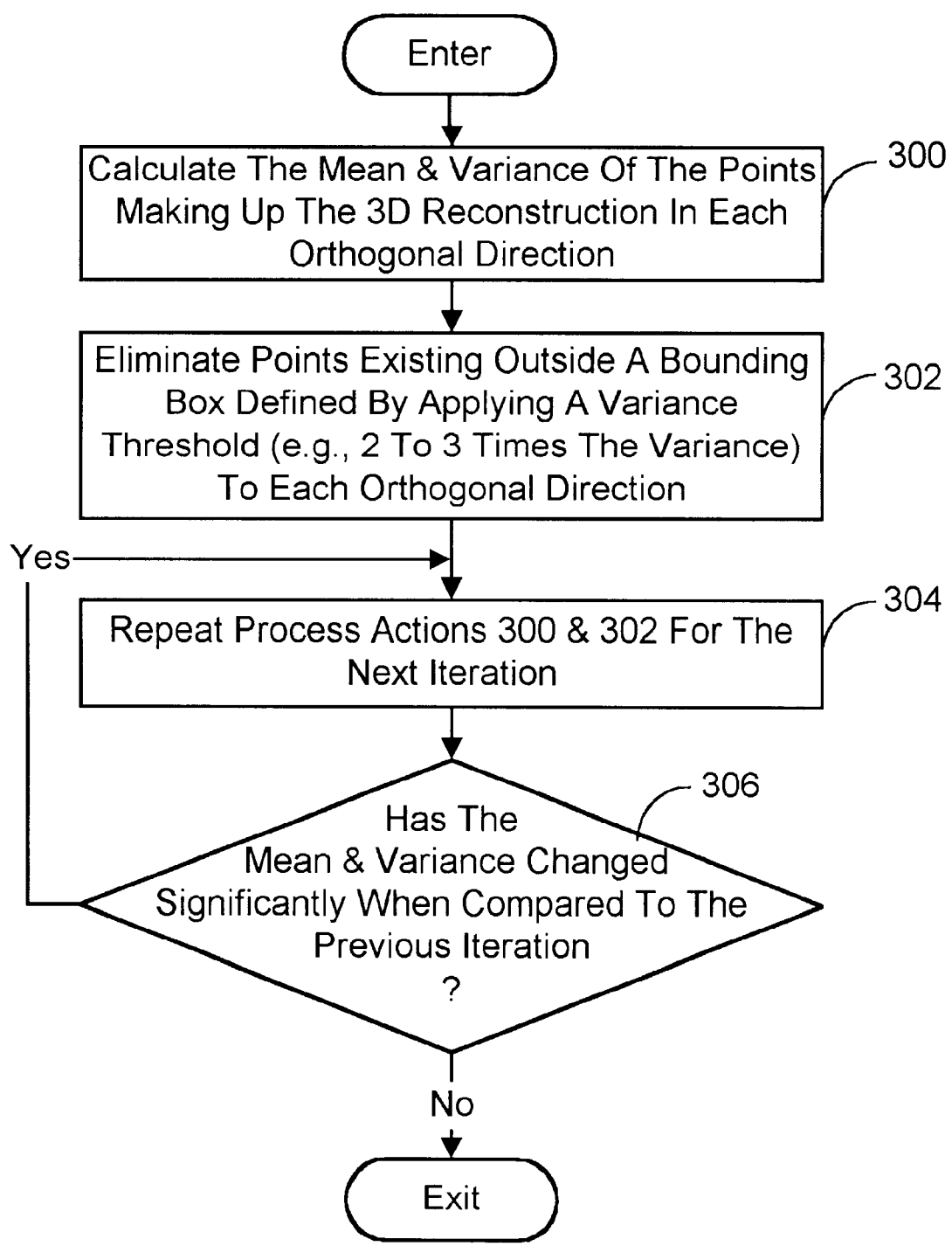
FIG. 3 is a flow chart diagramming a first noise elimination technique for use with the overall process of FIG. 2.
Figure 4:
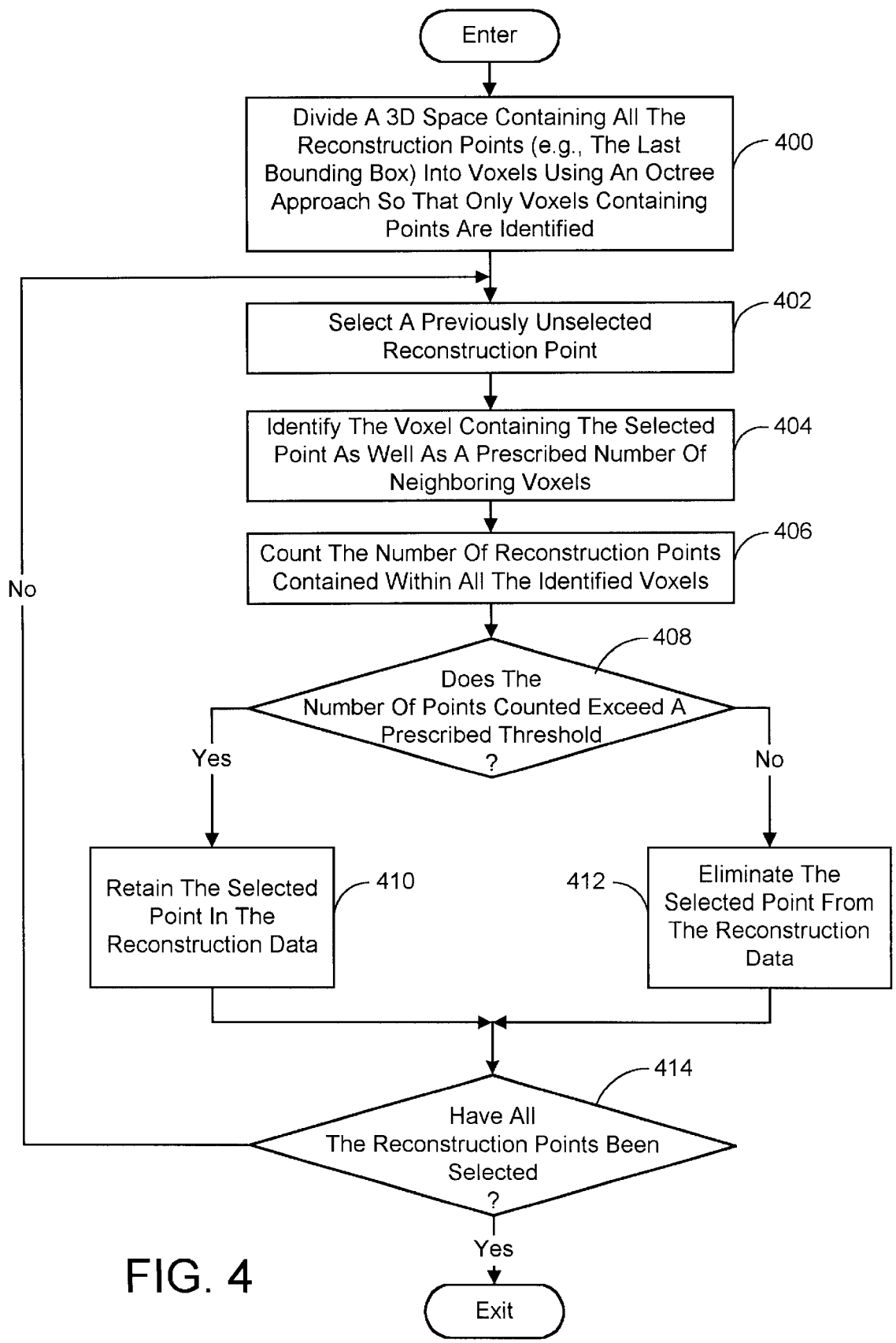
FIG. 4 is a flow chart diagramming a second noise elimination technique for use with the overall process of FIG. 2.

Each 3D reconstruction can be visualized as a "point cloud" essentially made up of a plurality of point locations representing the location in space of the portion of the object depicted in corresponding pixels of the images used in the reconstruction. These points are defined by a 3D coordinates system related to the orientation of the camera when the images where captured. Due to the inaccuracies introduced in the reconstruction process however, some of the points may not actually be associated with the surface of the object being modeled. The noise elimination procedure is used to eliminated as many of these extraneous points as possible. The first part of the procedure is referred to as "automatic clustering". Essentially, this method is based on the premise that the area having the greatest density in the point cloud represents the object being modeled. Referring to FIG. 3, the automatic clustering procedure begins by first calculating the mean distance of the points in the point cloud from the origin of the 3D coordinate system associated with the camera used to capture the images employed in computing the reconstruction, and then computing the associated variance, in each orthogonal direction (process action 300). A threshold is then applied in each direction, which can range from about 2 to 3 times the variance, but which is preferably twice the variance. This entails identifying a region that extends the same distance both ways from the computed means in each orthogonal direction to a total distance equaling the chosen multiple of the variance. The resulting region is essentially a cuboid-shaped bounding box. Any point lying outside the bounding box is culled from the 3D reconstruction data (process action 302). The procedures of process actions 300 and 302 are then repeated (process action 304) until there is no longer any significant change in the mean and variance between iterations (process action 306). While the automatic clustering method is good at eliminating extraneous reconstruction points outside the defined bounding boxes, it does nothing to eliminate extraneous points within the box, such as might exist in voids or holes associated with the object. A "3D spatial filtering" procedure can be used, if desired, to remove such points from the reconstruction data. Referring to FIG. 4, the 3D spatial filtering begins by cordoning off the 3D space containing the object (which could in this case be the last bounding box computed in the automatic clustering procedure) into voxels (process action 400). To minimize processing, an octree scheme [3] is employed resulting in only voxels containing reconstruction points being considered. Essentially, the octree approach involves first dividing the 3D space into large regions (e.g., 4 equal-sized regions) and eliminating any of these regions that do not contain points. Each of the remaining regions is then similarly divided (e.g., 4 equal-sized regions each), and again any region not containing points is eliminated. The process continues until these divided regions equal the desired size of the voxels. The spatial filtering process continues with each point being selected in turn (process action 402) and the voxel containing the point is identified along with a prescribed number of its neighboring voxels (process action 404). For example, one preferred spatial filtering method would identify a 3 by 3 by 3 voxel block, i.e., one consisting of 27 voxels with the center voxel containing the point under consideration. All the points contained in the voxel block are counted (process action 406). It is then determined if the total number of points exceeds a prescribed threshold (e.g., 2–4 points and preferably 3) in process action 408. If the threshold is exceeded, then the point remains in the reconstruction data (process action 410). Otherwise, the point is eliminated (process action 412). The foregoing process actions 402 through 410 or 412, are then repeated for all the remaining reconstruction points to complete the elimination procedure as indicated by process action 414.

3.0 Merging the 3D Reconstructions.

Once the noise elimination processing is complete, the various individual 3D reconstructions are merged into one overall 3D reconstruction of the object. This is essentially a registration process. It should be noted that the groups of consecutive images used to compute the individual 3D reconstructions would have been captured at a different orientations in relation to the object. As a result, the coordinate frames of each group may be different. Accordingly, to create an overall 3D reconstruction, the point sets associated with each of the individual reconstructions are aligned to a common coordinate frame. Any appropriate registration process can be employed for this purpose, however, it is preferred that this be accomplished via Euclidean transforms derived using an existing method referred to as iterative closest point (ICP) matching [4]. This method is preferred because it is fast, accurate, and robust. Further, it is noted that points with large uncertainty in the depth direction are preferably removed in the registration process, in order to accelerate the ICP convergence and improve the accuracy of the surface extraction procedure to be described next.

4.0 Surface Extraction.

Figure 5:
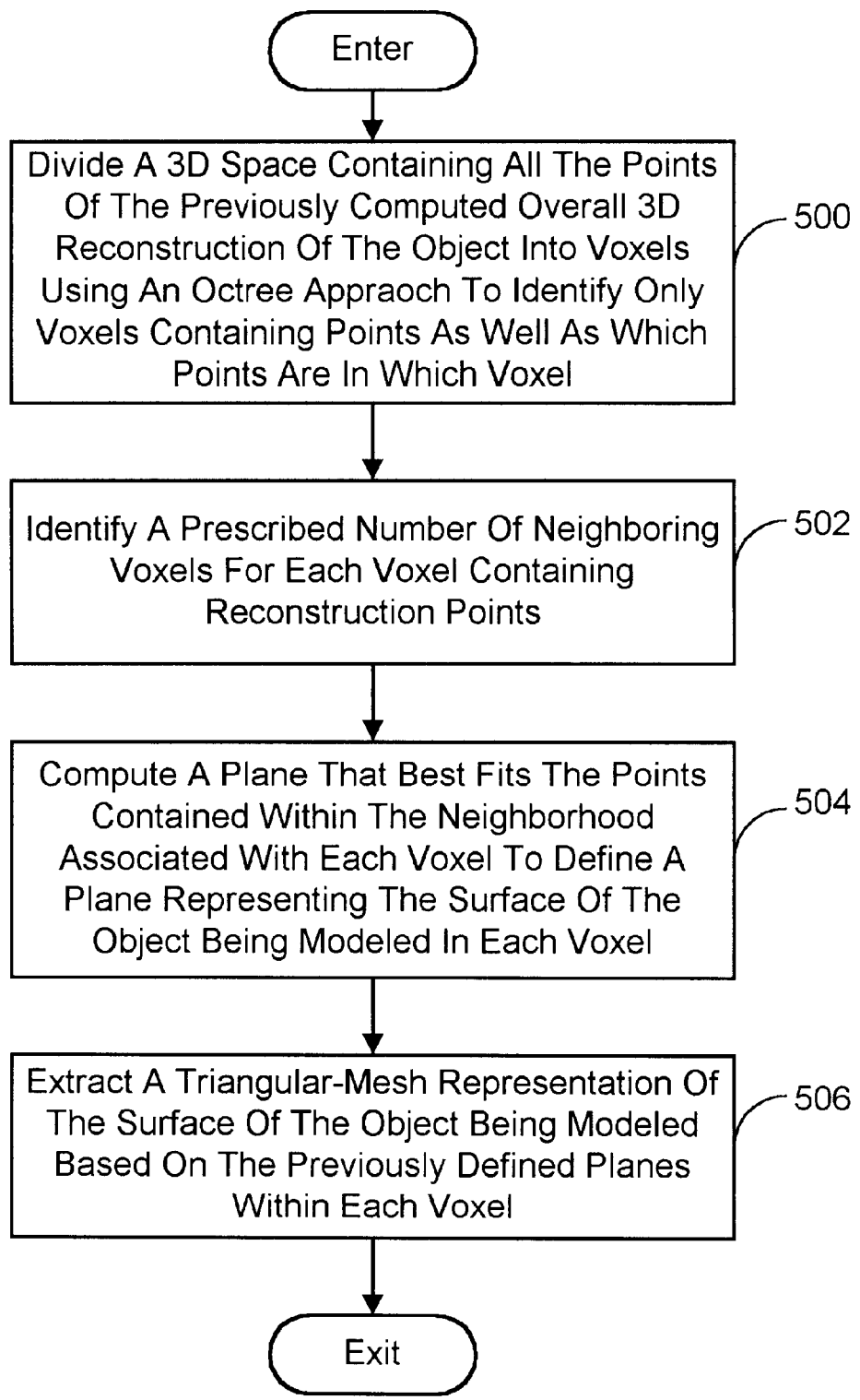
FIG. 5 is a flow chart diagramming a process for accomplishing the surface extraction program module of the overall process of FIG. 2.

The next phase of the present object modeling process involves a surface extraction procedure designed to define the surface of the object based on the points associated with the previously-computed overall 3D reconstruction. Several surface extraction methods are currently available and could be employed for this purpose. However, the following surface extraction procedure is preferred and believed to provide superior results. Referring to FIG. 5, the procedure begins with process action 500 by identifying the 3D volume containing all the points associated with the overall 3D reconstruction. Preferably, a simple bounding box scheme is employed to accomplish this task. The bounding box is partitioned into voxels using the hierarchical octree structure approach [3] to efficiently identify which voxels contain reconstruction points. In this way the set of reconstruction point that share a common voxel can be identified. Next, each voxel in turn undergoes a "signed distance computation" to define a plane which best represents the surface of the object in that voxel. Specifically, the signed distance computation begins by identifying a "neighborhood" of voxels for each voxel containing reconstruction points (process action 502).

For the purposes of the present object modeling process, a fixed neighborhood size was used—for example, the 3 by 3 by 3 voxel block used in tested embodiments of the present invention. The number of voxels included in the fixed neighborhood size will depend on the size of the object being modeled, as well as the size of the voxels employed, and so will depend on the specifics of the application. However, it is noted that the quality of the plane fitting depends largely on the size k of the neighborhood and a fixed size neighborhood size may not always provide the most accurate results. If a fixed neighbor size will not produce the desired accuracy, other well known, albeit more complex, procedures can be employed to establish the optimal neighborhood size. One criterion suggested by Hugues Hoppe et. al [2] is derived from the difference of three eigenvalues. If all of them have similar values, the k should be enlarged since the neighborhood is dominated by noise. On the other hand, if the value of $\lambda_3$ itself is large, the k should be reduced since the surface in the neighbor is too large to be properly fit by a plane. Alternately, it has been observed that for a certain octree depth, an optimal k can be easily found independent of the content of the object. Similar work can be found in reference [1].

Figure 6:
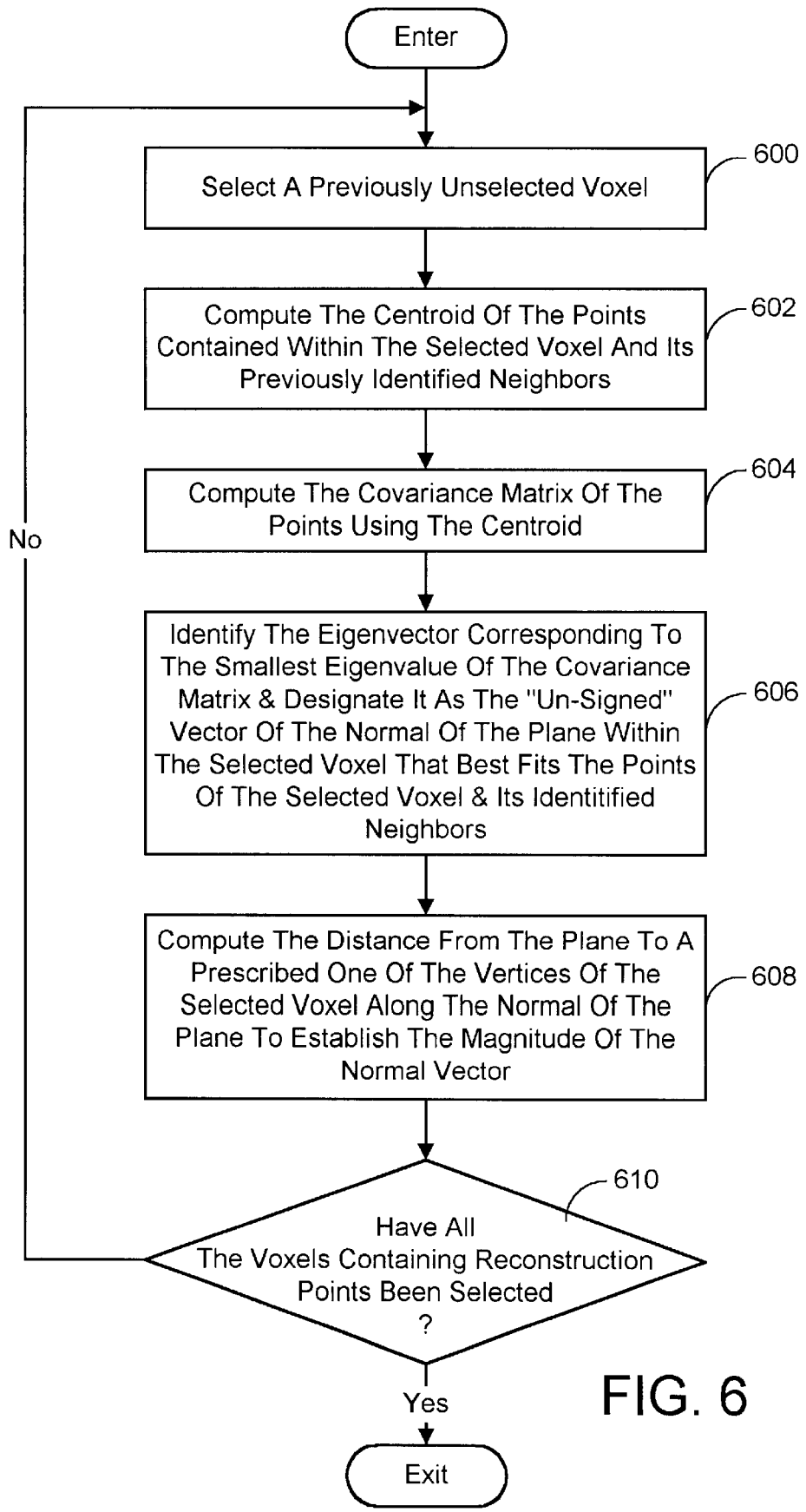
FIG. 6 is a flow chart diagramming a process for accomplishing the program module of the surface extraction process of FIG. 5 involving computing a series of plane normals.

Once the aforementioned neighborhood of each voxel is identified, all the points contained within each neighborhood are used to calculate a plane that best fits the points in that neighborhood and thus define a plane representing the surface of the object as it exists in each voxel (process action 504). Preferably, as outlined in FIG. 6, the plane is defined by a normal thereof extending between the plane to a prescribed one of the vertices of the voxel under consideration. This normal is established by first selecting one of the voxels (process action 600) and then computing the centroid o of all points q in the neighbor N((p)) in process action 602. The covariance matrix is then computed as:

$$\Sigma_{q \in N(p)}(q-o) \otimes (q-o) \quad (1)$$

where $\otimes$ denotes the outer product (process action 604). The eigenvector $v_3$ corresponding to the smallest eigenvalue $\lambda_3$ of the covariance matrix is identified and designated to be the direction of the normal vector, but with its sign (i.e., $v_3$ or $-v_3$) to be determined later (process action 606). The distance from the plane to the prescribed vertex along the normal direction is also calculated to establish the magnitude of the normal vector (process action 608). The process actions 600 through 608 are then repeated for each voxel containing reconstruction points as indicated by process action 610.

Figure 7:
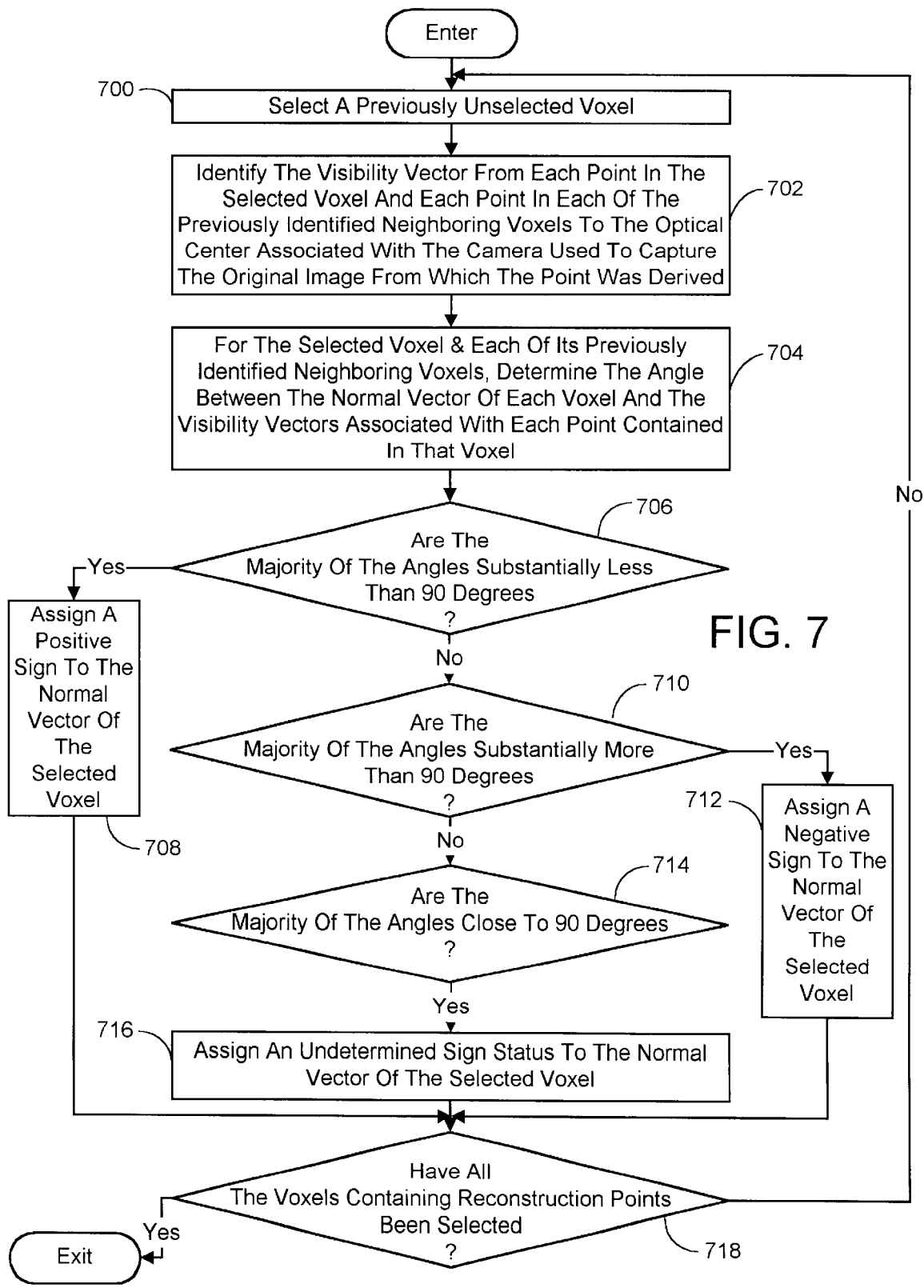
FIG. 7 is a flow chart diagramming a first process for determining the direction of the plane normals computed in the process of FIG. 6.

Once a normal has been established for each voxel, a correction procedure is performed to establish the sign of the normal for each voxel. Essentially, this involves finding which of the two directions that the normal could take is consistent for the voxel neighborhood. Referring to FIG. 7, this is accomplished by first selecting one of the voxels (process action 700) and then identifying the direction vector from each point in the selected voxel, as well as each point in each of the previously identified neighboring voxels associated with the selected voxel, to the optical center associated with the camera used to capture the original image from which the point was derived (process action 702). This should already known from the previously-described registration procedure. The vector from a reconstruction point to its associated optical center is referred to hereinafter as the visibility vector $v_j$. The angle between the normal computed for each voxel in a voxel neighborhood and the visibility vector for each point contained in that voxel is then determined (process action 704). Statistical methods are then preferably employed to establish a consensus for all the points in all the voxels in the voxel neighborhood. At its simplest, the normal vector of the selected voxel would be assigned a positive direction (i.e., toward the prescribed vertex) if a majority of the aforementioned angles between the visibility vectors and associated normals of the selected voxel and its neighbors were less than 90 degrees by a prescribed threshold amount, and assigned a negative direction (i.e., away from the prescribed vertex) when the majority of the angles are greater than 90 degrees by the prescribed threshold amount. Preferably, this threshold amount is in a range of about 15 to 30 degrees. More specifically, the procedure can be accomplished as follows. Consider a voxel with a known k sized neighborhood, of which the tangent plane normal n has been computed. Given visibility vector $v_j$ for all the reconstruction points $p_j$, j=0, . . . , m in the k-neighborhood, the sign of $n \cdot v_j$ should be consistent over large visible regions of the surface. Therefore the following rule could be applied:

$$n = \begin{cases} n & n^+ > n^- \\ -n & \text{else} \end{cases} \quad (2)$$

where $n^+$ and $n^-$ are the numbers of positive and negative signs of $n \cdot v_j$, respectively.

However, there can be regions of an object's surface where the plane normal of a voxel is almost perpendicular (e.g., within a prescribed range of about 70 degrees to 110 degrees) to most of the visibility vectors $v_j$ associated with the points contained in the voxel. If this occurs there is some ambiguity as to whether the normal points in the positive or negative direction. The foregoing Equation (1) can be modified to account for this possibility as follows:

$$n = \begin{cases} x & n^a > 0.5 \\ n^d & \text{else} \end{cases} \quad (2)$$

where $n^a$ denotes the percentage of neighboring voxels in the voxel neighborhood that exhibit the aforementioned ambiguous condition, x denotes that the sign of the plane normal of the voxel under consideration is marked as undetermined if $n^a > 0.5$, and $n^d$ denotes that the sign of the plane normal of the voxel under consideration is determine by the result of Equation (1) when the case is otherwise.

Thus referring to FIG. 7, it is first determined if the majority of the visibility angles are less than 90 degrees by a prescribed threshold amount (process action 706). If so, a positive sign (i.e., toward the prescribed vertex) is assigned to the "unsigned" normal vector of the selected voxel (process action 708). If not, however, it is then determined if the majority of the visibility angles are more than 90 degrees by the prescribed threshold amount (process action 710). If is they are, a negative sign (i.e., away from the prescribed vertex) is assigned to the "unsigned" normal vector of the selected voxel (process action 712). If they are not, then in process action 714 it is determined if the majority of the visibility angles are close to 90 degrees (i.e., within the prescribed threshold amount). As this is the only other possibility, the answer to this query must be yes, and in process action 716, the sign of the selected voxel's normal vector is designated as being undetermined. Finally, as indicated in process action 718, once the normal vector of the selected voxel has been assigned either a positive, negative or undetermined sign, process actions 700 through 708, 712, or 716 are repeated for the remaining voxels.

Figure 8:
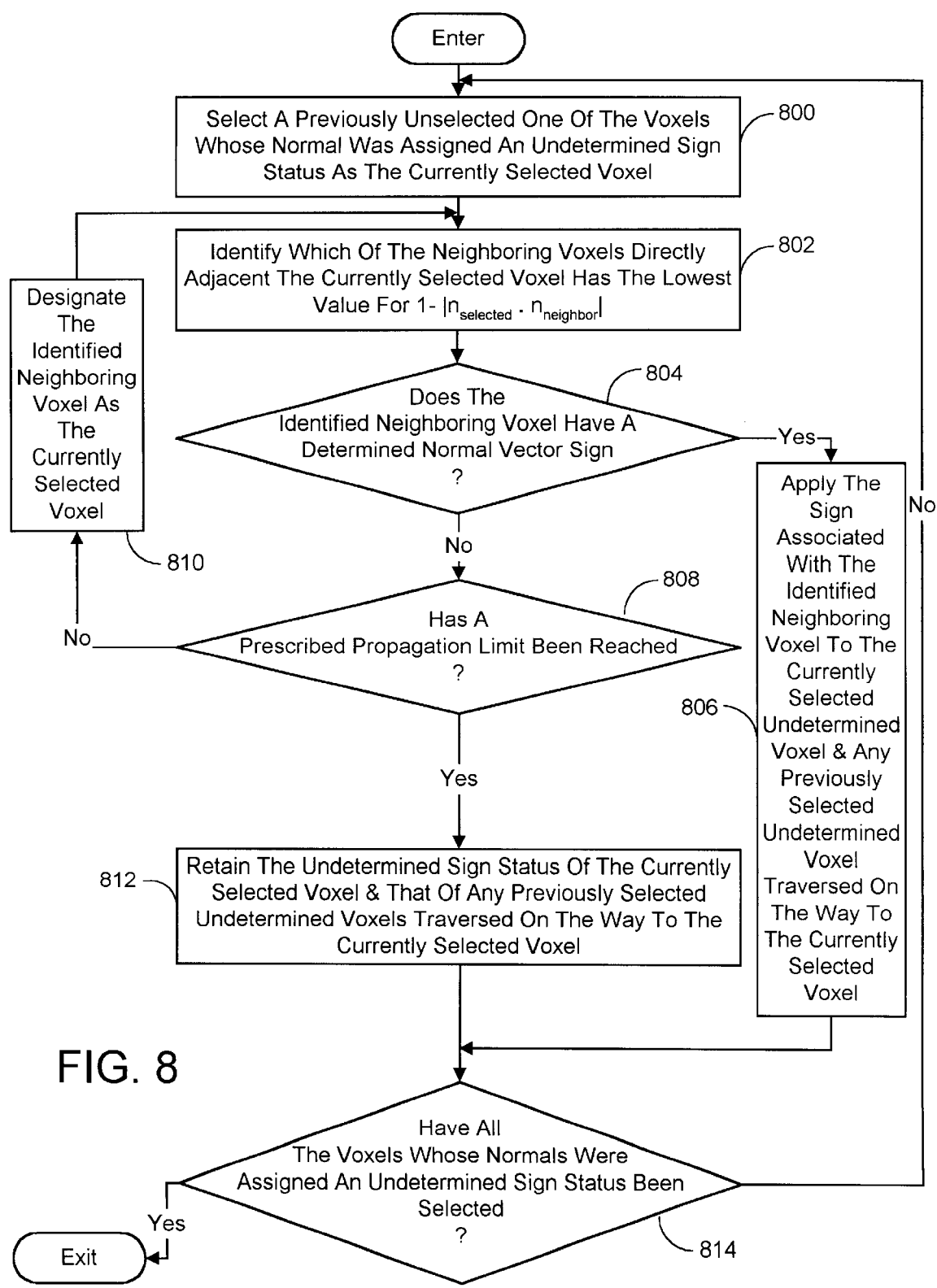
FIG. 8 is a flow chart diagramming a second process for determining the direction of the plane normals computed in the process of FIG. 6.

The sign of the plane normal of a voxel that was marked as being undetermined is preferably determined by a combination of a back propagation procedure and a local consistency check. Back propagation generally involves using the sign of the plane normals computed for neighboring voxels to indicate what the sign should be for the normal of a voxel having an undermined sign. Referring to FIG. 8, the back propagation procedure begins by selecting a voxel u that was marked as having a plane normal with an undetermined sign (process action 800), and identifying which of the directly adjacent neighboring voxels v has the lowest value for $1-|n_u \cdot n_v|$, where $n_u$ is the normal vector for the voxel u and $n_v$ is the normal vector for a neighboring voxel v (process action 802). It is then ascertained if the identified neighboring voxel has a previously determined sign for its plane normal as indicated by process action 804. If so, the same sign is applied to the plane normal of the "undetermined" voxel u (process action 806). However, if the neighboring voxel having the lowest value for $1-|n_u \cdot n_v|$ also has a plane normal with an undetermined sign, then the identified neighboring voxel is designated as the currently selected voxel (process action 810) as long as a prescribed propagation limit has not been reach (process action 808). Process actions 802 through 810 are repeated until a voxel with a determined normal direction is encountered or it is determined that the prescribed propagation limit has been reached. In the case where a voxel having a determined normal sign is reached within the propagation limits, the sign associated with that voxel's normal is assigned to the currently selected voxel as well as any previously selected "undetermined" voxels that were traversed on the way to the currently selected voxel (process action 806). The aforementioned prescribed propagation limit (or so-called marching distance) is imposed to prevent excessive propagation to parts of the object surface which may not be related to the surface in the ambiguous region. This limit will vary depending on the object being modeled. If in process action 808, it is ascertained that the prescribed propagation limit has been reached, then the "undetermined sign" status of the currently selected voxel, and that of any previously selected "undetermined" voxels that were traversed on the way to the currently selected voxel, are retained (process action 812). The process of action 800 through 806 or 812 is then repeated for any remaining previously unselected voxels whose normal vector was assigned an "undetermined" sign as indicated by process action 814.

Figure 9:
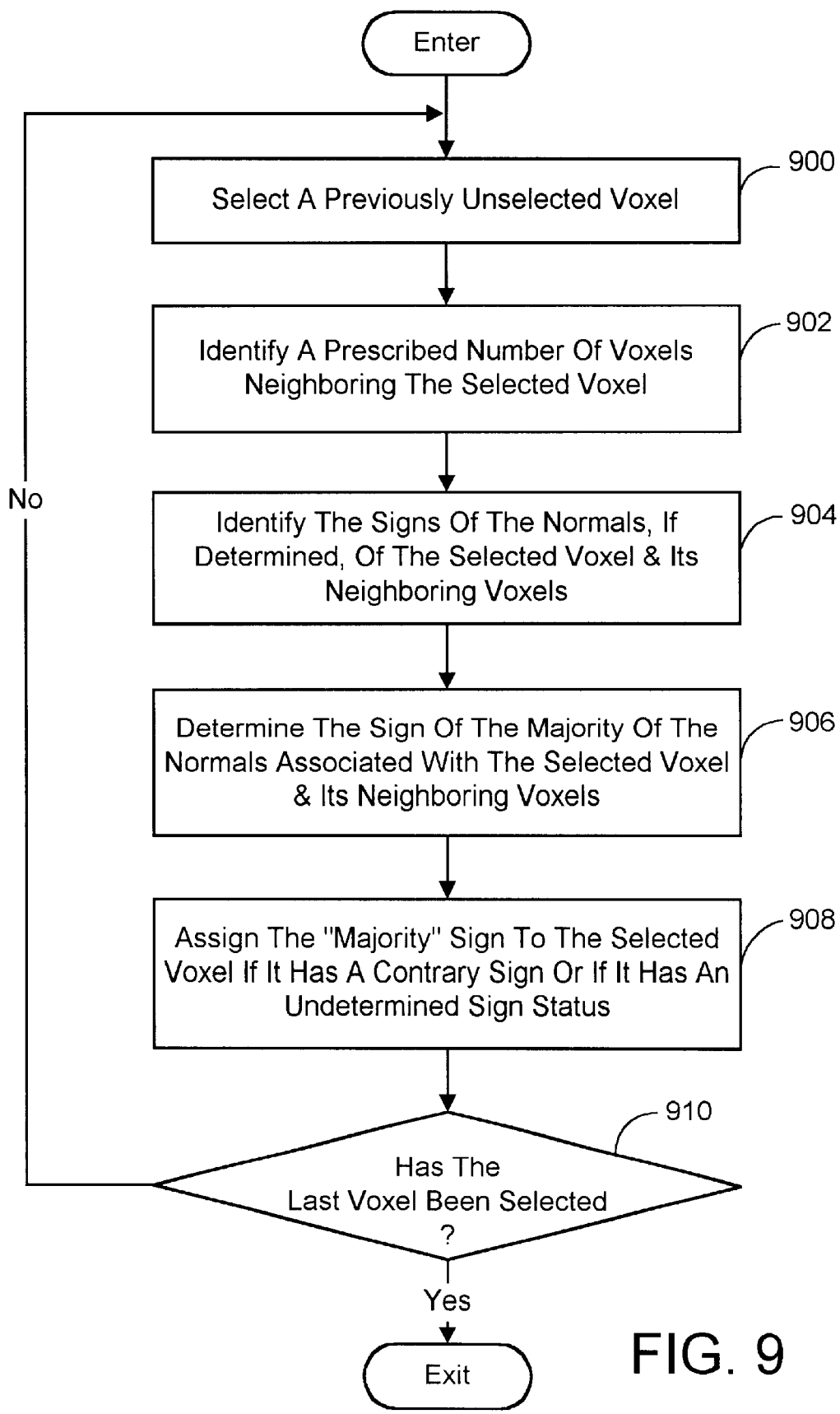
FIG. 9 is a flow chart diagramming a third process for determining the direction of the plane normals computed in the process of FIG. 6.

Once the foregoing back propagation procedure is complete, it is preferred that an additional check be made to ensure the derived normal signs are realistic and to designate a sign for the normal vectors of any remaining "undetermined" voxels. Specifically, this entails imposing a local consistency check. Referring to FIG. 9, the check procedure begins by selecting one of the voxels (process action 900). A prescribed number of voxels neighboring the selected voxel are then identified in process action 902. As before, a fixed block (e.g., a 3 by 3 by 3 voxel block) can be employed, but the size of the neighborhood could be chosen via any appropriate procedure. The process continues with the identification of the signs associated with the normals, if previously determined, of the selected voxel and its neighboring voxels (process action 904). The sign associated with the majority of the voxels is then determined (process action 906). The sign of the normal vector of the selected voxel is re-assigned to match the majority sign if it is opposed, or is assigned the majority sign if the normal vector's sign was previously designated as undetermined (process action 908). Process action 900 through 908 are repeated for each remaining unselected voxel, as indicated by process action 910. The local consistency check ends the aforementioned signed distance computation portion of the preferred surface extraction method. At this point, the signed direction and magnitude of the plane normals for each voxel have been computed.

Figure 10:
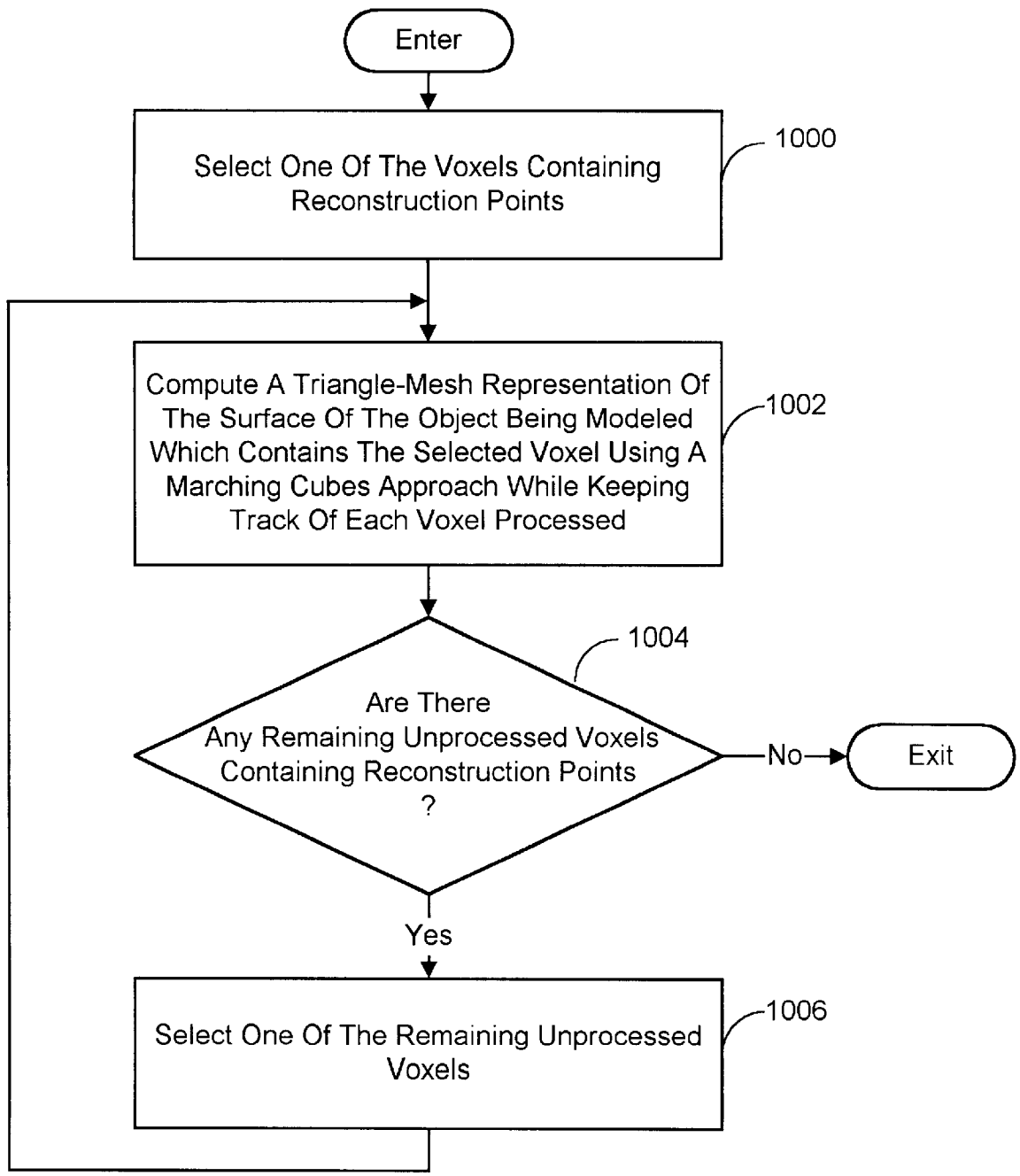
FIG. 10 is a flow chart diagramming a process for accomplishing the program module of the surface extraction process of FIG. 5 involving extracting a triangular-mesh representation of the surface of the object being modeled.

Referring once again to FIG. 5, the next action in the surface extraction procedure is to extract a triangular-mesh representation of the surface of the object defined by the previously computed planes within each voxel associated with the object's surface (process action 506). Preferably, a modified marching cubes approach is employed for this purpose. The marching cubes procedure is a known method for extracting a triangular-mesh representation from an implicit surface. This method is modified in the present object modeling process to incorporate an octree based approach, which has the advantage of not needing a seed cube and eliminating the possibility that a disjointed portion of the object being modeled would be missed. In the traditional marching cubes method, a voxel is selected (i.e., the seed cube) that contains a portion of the surface of the object. The triangular-mesh representation of the surface is then constructed by, inter alia, identifying a neighboring voxel containing a part of the surface and "marching" voxel by voxel until surface is analyzed. However, if the object being modeled is made up of multiple, separated sections, then the traditional method will miss the disjointed portions of the object not containing the surface component of the seed cube. In the modified procedure, this problem is resolved using the aforementioned octree approach. As explained earlier, the point cloud associated with the registered 3D reconstructions was partitioned into voxels using the hierarchical octree approach that ultimately identified each voxel that contained reconstruction points. The modified marching cubes procedure uses this information as follows. Referring to FIG. 10, any one of the previously defined voxels containing reconstruction points is selected (process action 1000). The triangular-mesh surface representation is then computed by proceeding as in the traditional marching cubes method, with the exception that an accounting of each voxel processed is kept (process action 1002). When all the voxels containing a section of the surface of the portion of the object associated with the initially selected voxel have been processed, it is determined in process action 1004 if any un-processed voxels exist (as would be the case if the object is made up of disjointed surfaces). Whenever, it is determined that un-processed voxels exist, one of them is selected (process action 1006) and the procedure of process actions 1002 through 1006 is repeated until no more un-processed voxels remain. In this way every voxel containing reconstruction points is processed and so every surface making up the object will be modeled.

5.0 Texture Mapping.

Once the surface extraction procedure is complete, it is possible to also perform a texture mapping process to create a photorealistic model of the image. While many texture mapping method exist that could be used for this purpose, it is preferred that texture be added to the model using a method of blending portions of the original images used to produce the 3D reconstructions as was described in a co-pending patent application entitled PATCH-BASED ALIGNMENT METHOD AND APPARATUS FOR CONSTRUCTION OF IMAGE MOSAICS and having a common assignee with the present application. This co-pending application was filed on Aug. 8, 1997, and assigned Ser. No. 08/905,100. The disclosure of the co-pending application is hereby incorporated by reference. Essentially, for each of the triangular areas of the object's surface defined in the surface extraction procedure, the portions of the original images that depict that particular triangular area are identified via known methods. These areas are then blended to create a composited representation of the area. Finally, this composited representation is assigned as the texture for the selected area.

6.0 Experimental Results.

Figures 11, 12:
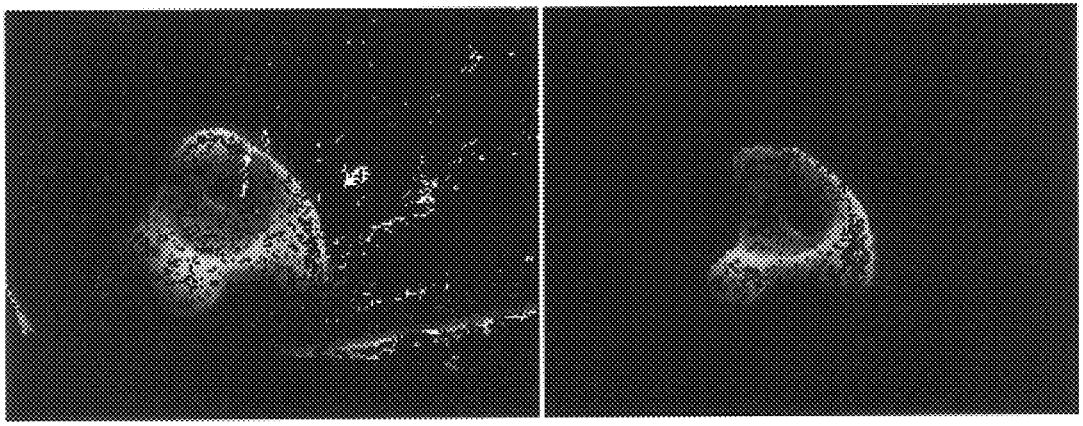
FIGS. 11 and 12 are images depicting the point set associated with a 3D reconstruction of an object being modeled, before noise elimination techniques were applied (FIG. 11), and after noise elimination techniques were applied (FIG. 12).
Figures 13, 14:
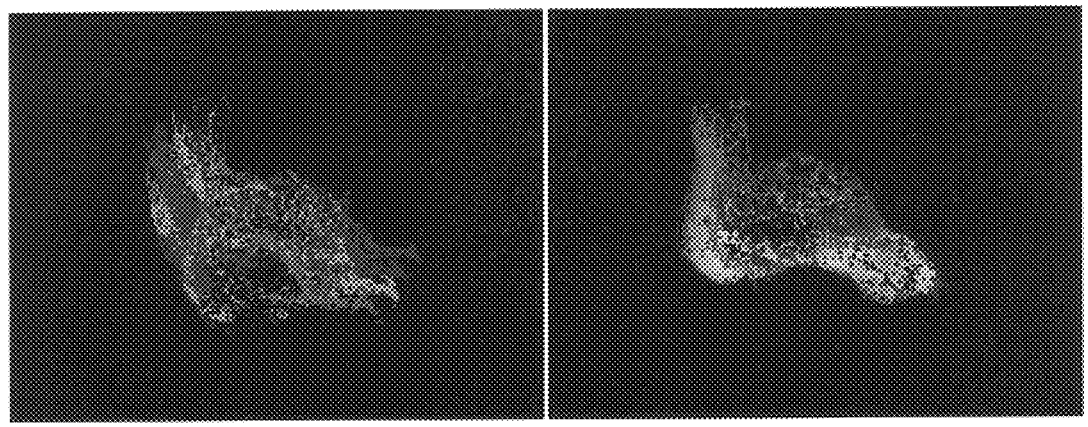
FIGS. 13 and 14 are images depicting the point set associated with an overall 3D reconstruction of an object being modeled, before registration (FIG. 13), and after registration (FIG. 14).
Figures 15, 16:
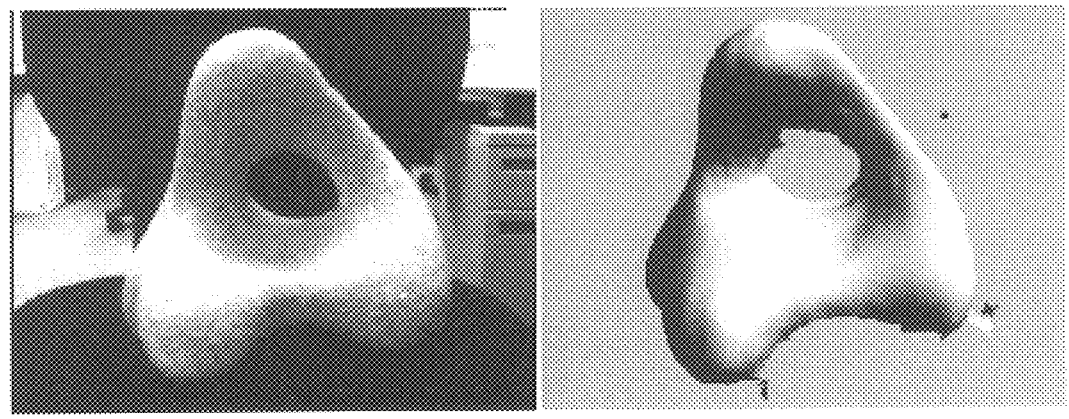
FIGS. 15 and 16 are images comparing the original object depicted in FIG. with the modeled object created in accordance with the present invention shown in FIG. 16.

In a tested embodiment of the present invention, a commercial trinocular stereo system was used to capture images of an object. FIG. 11 shows an original stereo reconstruction derived from these images, and as can be seen it is very noisy. In the noise elimination stage, points in the foreground and background, as well as those reconstructed from mismatched pairs are removed. The result is given in the image of FIG. 12. It can be seen that holes are enlarged in some areas on the point set after the noise elimination. This problem is introduced by the 3D spatial filtering, where neighborhood support is used to eliminate the isolated points. Obviously, there should be a tradeoff between the cleanliness and the completeness of the point set from a single reconstruction. We emphasize the former in the noise elimination phase and leave the latter to be handled in the registration stage, where point sets from multiple reconstructions are merged together. The image of FIG. 13 shows an overlay of four unregistered clusters of stereo reconstruction points, and the image of FIG. 14 is the point set after these four clusters are registered with the ICP method. The final result of the registration stage is a complete sample point set of the target object, and with fewer holes on it as can be seen. The geometric model extracted from the registered point set is shown in the image of FIG. 16, and the image of the real object, captured from a similar front viewpoint, is shown in the image of FIG. 15. Note that the upper part of the inner hole is poorly reconstructed, probably due missing data from the original images.

References

[1] B. Curless and M. Levoy. A volumetric method for building complex models from range images. In *Compute Graphics* (SIGGRAPH'96 Proceedings), pages 303–312, 1996.

[2] H. Hoppe. Surface reconstruction from unorganized points. In *Compute Graphics* (SIGGRAPH'92 Proceedings), pages 71–78, July 1992.

[3] H. Samet. *The design and analysis of spatial data structures*. AddisonWesley, Reading, Mass., 1990.

[4] Z. Zhang. Iterative point matching for registration of freeform curves and surfaces. *The International Journal of ComputerVision*, 13(2):119–152, 1994.

Wherefore, what is claimed is:

1. A computer-implemented process for modeling an object, comprising the actions of:

capturing images of the object that collectively depict all the object's surfaces which are to be modeled;

deriving a 3D reconstruction of a portion of the object's surfaces from each of a plurality of sets of one or more of the images, said 3D reconstructions comprising a plurality of point locations corresponding to points on the object's surfaces;

registering each 3D reconstruction to a common coordinate system to produce an overall 3D reconstruction of the object's surfaces;

extracting a surface representation of the object from the overall 3D reconstruction; and creating a texture map for the surface representation of the object using the previously captured images of the object.

2. The process of claim 1, further comprising performing a noise reduction procedure prior to performing the action of registering the 3D reconstructions, said noise reduction comprising, for each 3D reconstruction, the actions of:

(a) calculating a mean distance of the points making up a 3D reconstruction, from the origin of a 3D coordinate system associated with a camera used to capture the images employed in computing the reconstruction, in each of the three orthogonal directions;

(b) calculating a variance of the points making up the 3D reconstruction in each of the orthogonal directions based on the mean computed for the respective direction;

(c) eliminating points existing outside a region that extends the same distance both ways from the computed mean in each orthogonal direction to a total distance that is a prescribed multiple of the computed variance for that direction;

(d) repeating process actions (a) through (c);

(e) determining if the newly computed mean and variance in each orthogonal direction has changed more than a prescribed limit for each when compared to the corresponding mean and variance computed during the preceding iteration;

(f) repeating process actions (a) through (c), and (e), whenever the newly computed mean and variance in any orthogonal direction has changed more than the prescribed limits for that direction when compared to the corresponding mean and variance computed during the preceding iteration.

3. The process of claim 1, further comprising performing a noise reduction procedure prior to performing the action of registering the 3D reconstructions, said noise reduction comprising, for each 3D reconstruction, the actions of:

dividing a 3D space containing all the reconstruction points associated with a 3D reconstruction into voxels;

ascertaining which voxels contain at least one reconstruction point; and for each reconstruction point,
identifying the voxel containing the reconstruction point,
identifying a prescribed number of voxels neighboring the previously identified voxel,
counting the number of reconstruction points contained within all the identified voxels,
determining whether the number of points counted exceeds a prescribed limit, and
eliminating the reconstruction point from the 3D reconstruction whenever the number of points counted does not exceed the prescribed limit.

4. The process of claim 1, wherein the process action of extracting a surface representation of the object from the overall 3D reconstruction, comprises the actions of:

dividing a 3D space containing all the reconstruction points associated with the overall 3D reconstruction into voxels;

ascertaining which voxels contain at least one reconstruction point;

for each voxel containing at least one reconstruction point,
identifying a prescribed number of voxels neighboring the voxel,
computing a plane that best fits the reconstruction points contained within the voxel and the identified neighboring voxels to define a plane representing the surface of the object being modeled in the voxel; and extracting a triangular-mesh representation of the surface of the object being modeled based on the planes defined for each voxel containing reconstruction points.

5. The process of claim 4, wherein the process action of computing a plane that best fits the reconstruction points contained within a voxel and its neighboring voxels, comprises the actions of:

computing the centroid of the reconstruction points contained within the voxel and its previously identified neighboring voxels;

computing a covariance matrix for the reconstruction points contained within the voxel and its previously identified neighboring voxels based on the centroid;

identifying an eigenvector corresponding to the smallest eigenvalue found in the covariance matrix and designating the identified eigenvector as the vector of a normal of the plane that best fits the reconstruction points contained within the voxel and its previously identified neighboring voxels, wherein the normal vector is initially designated without specifying which of two possible directions the normal is directed; and computing the distance from the plane to a prescribed one of the vertices of the voxel along said normal vector of the plane to establish the magnitude of the normal vector; and, determining which of the two possible directions the normal vector is directed, if feasible, and assigning that direction to the vector.

6. The process of claim 5, wherein the process action of assigning the direction to the normal vector, comprises the action of:

assigning a positive sign to the normal vector if it is directed toward the prescribed vertex of the voxel; and assigning a negative sign to the normal vector if it is directed away from the prescribed vertex of the voxel.

7. The process of claim 5, wherein the process action of determining which of the two possible directions the normal vector is directed and assigning that direction to the normal vector, comprises the actions of:

identifying a direction vector from each point in the voxel, and each point in each of the previously identified neighboring voxels associated with the voxel, to the optical center associated with the camera used to capture the original image from which the point was derived, said direction vector hereinafter being referred to as a visibility vector;

for the voxel and each of its associated neighboring voxels, respectively determining the angle between the normal vector of each voxel and the visibility vector associated with each point contained in that voxel;

ascertaining whether a majority of the angles are one of (i) less than 90 degrees by a prescribed threshold amount, (ii) more than 90 degrees by the prescribed threshold amount, or (iii) within the prescribed threshold amount of 90 degrees;

assigning a positive sign to the normal vector to indicate that it is directed toward the prescribed vertex of the voxel whenever a majority of the angles are less than 90 degrees by the prescribed threshold amount;

assigning a negative sign to the normal vector to indicate that it is directed away from the prescribed vertex of the voxel whenever a majority of the angles are more than 90 degrees by the prescribed threshold amount;

assigning an undetermined direction status to the normal vector whenever a majority of the angles are within the prescribed threshold amount of 90 degrees.

8. The process of claim 5, wherein the process action of determining which of the two possible directions the normal vector is directed and assigning that direction to the normal vector, further comprises the actions of:

(a) selecting a previously unselected voxel having a normal vector with an undetermined direction status and designating it the currently selected voxel;

(b) identifying which directly adjacent neighboring voxel produces the largest absolute value for the cross product of the normal vector associated with the currently selected voxel and the normal vector associated with the neighboring voxel;

(c) ascertaining whether the neighboring voxel identified as having said largest cross product value has been assigned a direction, (d) applying the direction assigned to the neighboring voxel identified as having said largest cross product value to the normal vector associated with the currently selected voxel and proceeding to process action (I), whenever said neighboring voxel's normal vector has been assigned a direction, and otherwise, (e) designating the neighboring voxel identified as having said largest cross product value to the normal vector associated with the currently selected voxel, as the currently selected voxel in lieu of the previously selected voxel, whenever said neighboring voxel's normal vector has not been assigned a direction;

(f) identifying which directly adjacent neighboring voxel produces the largest absolute value for the cross product of the normal vector associated with the currently selected voxel and the normal vector associated with the neighboring voxel;

(g) ascertaining whether the neighboring voxel identified as having said largest cross product value has been assigned a direction, (h) applying the direction assigned to the neighboring voxel identified as having said largest cross product value to the normal vector associated with the currently selected voxel and any previously selected voxels still having an undetermined direction status, and then proceeding to process action (I), whenever said neighboring voxel's normal vector has been assigned a direction; and otherwise, (i) designating the neighboring voxel identified as having said largest cross product value to the normal vector associated with the currently selected voxel, as the currently selected voxel in lieu of the previously selected voxel, whenever said neighboring voxel's normal vector has not been assigned a direction, as long as a prescribed propagation limit pertaining to the number voxels that have been designated as a currently selected voxel in a current iteration has not been exceeded;

(j) continuing the current iteration by repeating process actions (f) through (h) or (i), whenever the currently selected voxel's normal vector has not been assigned a direction and said propagation limit has not been reached;

(k) retaining the undetermined direction status of the currently selected voxel and any previously selected voxels still having an undetermined direction status, whenever said propagation limit has been reached; and (l) performing a new iteration by repeating the appropriate ones of process actions (a) through (I) until there are no remaining previously unselected voxels having a normal vector with an undetermined direction status.

9. The process of claim 5, further comprising performing a local consistency check to ensure that the assigned normal vector direction for each voxel having an assigned direction is accurate, said local consistency check comprising, for each voxel containing at least one reconstruction point, the actions of:

identifying a prescribed number of voxels neighboring the voxel under consideration;

ascertaining the direction assigned to the normal vector associated with the voxel under consideration and its identified neighboring voxels for all the normal vectors that have an assigned direction;

determine which direction the majority of the normal vectors associated with the voxel under consideration and its identified neighboring voxels are assigned for all the normal vectors that have an assigned direction;

assign said majority direction to the voxel under consideration if it has been previously assigned a contrary direction or if it does not have an assigned direction.

10. The process of claim 4, wherein the process action of extracting a triangular-mesh representation of the surface of the object being modeled, comprises the actions of:

(a) selecting a previously unselected voxel containing reconstruction points;

(b) computing the triangle-mesh representation of the portion of the object being modeled having a surface that contains the selected voxel using a marching cubes procedure while keeping track of each voxel processed via the procedure;

(c) determining whether there are any remaining unprocessed voxels containing reconstruction points;

(d) selecting one of any remaining unprocessed voxels containing reconstruction points in lieu of the previously selected voxel; and (e) repeating process actions (b) through (d) until there are no remaining unprocessed voxels containing reconstruction points,.

11. A system for modeling an object, comprising:

a camera for capturing digital images of the object that collectively depict all the object's surfaces which are to be modeled;

a general purpose computing device;

a computer program comprising program modules executable by the computing device, wherein the computing device is directed by the program modules of the computer program to, input said digital images of the object, select a plurality of sets of one or more of the digital images, compute a 3D reconstruction of a portion of the object's surfaces from each set of digital images, said 3D reconstructions comprising a plurality of reconstruction points, register each 3D reconstruction to a common coordinate system to produce an overall 3D reconstruction of the object's surfaces, extract a surface representation of the object from the overall 3D reconstruction, and create a texture map for the surface representation of the object using the previously captured images of the object.

12. The system of claim 11, further comprising a program module for eliminating extraneous points from each individual 3D reconstruction prior to performing the program module for registering the 3D reconstructions, said program module for eliminating extraneous points comprising the following sub-modules:

for each 3D reconstruction, calculating a mean distance of the reconstruction points in each of the three orthogonal directions from the origin of a 3D coordinate system associated with said camera used to capture the images employed in computing the reconstruction, as well as a variance in each direction based on the associated mean, eliminating those reconstruction points existing outside a cuboid region defined by extending the same distance both ways from each mean in each orthogonal direction for a total distance equal to a prescribed multiple of the variance associated with the mean in that direction, repeating the calculating and eliminating sub-modules until the mean and variance in each orthogonal direction has not changed more than a prescribed amount.

13. The system of claim 12, wherein the program module for eliminating extraneous points further comprises sub-modules for:

using an octree approach to divide a 3D space containing all the reconstruction points associated with each of the 3D reconstructions into voxels each of which contains at least one reconstruction point; and for each reconstruction point in each of the 3D reconstructions, identifying a voxel neighborhood made up of the voxel containing the reconstruction point and a prescribed number of neighboring voxels, counting the number of reconstruction points contained within the voxels of the voxel neighborhood, and eliminating the reconstruction point whenever the number of points counted in the voxel neighborhood associated with the point does not exceed a prescribed threshold number.

14. The system of claim 11, wherein the program module for extracting a surface representation of the object from the overall 3D reconstruction comprises sub-modules for:

using an octree approach to divide a 3D space containing all the reconstruction points associated with the overall 3D reconstruction into voxels each of which contains at least one reconstruction point;

identifying a voxel neighborhood for each voxel made up of the voxel and a prescribed number of neighboring voxels;

respectively computing a plane for each voxel that best fits the reconstruction points contained within its associated voxel neighborhood; and extracting a triangular-mesh representation of the surface of the object being modeled based on the planes defined for each voxel.

15. The system of claim 14, wherein the sub-module for extracting a triangular-mesh representation of the surface of the object being modeled, comprises sub-modules for:

selecting a voxel;

employing a marching cubes procedure to compute the triangle-mesh representation of the portion of the object being modeled which has a surface contained within the selected voxel while keeping track of each voxel processed via the procedure;

selecting one of any remaining unprocessed voxels; and repeating the sub-modules for employing the marching cubes procedure and selecting one of any remaining unprocessed voxels until there are no remaining unprocessed voxels.

16. A computer-readable memory for modeling an object, comprising:

a computer-readable storage medium; and a computer program comprising program modules stored in the storage medium, wherein the storage medium is so configured by the computer program that it causes a computer to, compute a series of 3D reconstructions from inputted images depicting every surface of the object that is to be modeled, wherein each reconstruction is comprised of a plurality of reconstruction points which correspond to a portion of the object's surfaces, and wherein collectively the 3D reconstructions comprise points that represent all of the object's surfaces;

register each 3D reconstruction to a common coordinate system to produce an overall 3D reconstruction of the object's surfaces; and extract a surface representation of the object from the overall 3D reconstruction.

17. The computer-readable memory of claim 16, further comprising a program module which creates a texture map for the surface representation of the object using the inputted images depicting the surfaces of the object.

18. The computer-readable memory of claim 16, further comprising a program module for eliminating reconstruction points that are not representative of the object's surfaces which is executed prior to executing the program module for registering the 3D reconstructions, said reconstruction point elimination module comprising executing the following sub-modules for each 3D reconstruction:

calculating a separate mean distance for the reconstruction points in each of the three orthogonal directions from the origin of a 3D coordinate system associated with a camera used to capture the images employed in computing the reconstruction points;

calculating a variance of the reconstruction points in each of the orthogonal directions based on the mean computed for the respective direction;

eliminating points existing outside a region that extends the same distance both ways from the computed mean in each orthogonal direction to a total distance equal to a prescribed multiple of the computed variance for that direction;

re-executing both calculating sub-modules and the eliminating sub-module until the mean and variance in each orthogonal direction has not changed more than a prescribed amount from the last time these values were calculated.

19. The computer-readable memory of claim 16, further comprising a program module for eliminating reconstruction points that are not representative of the object's surfaces which is executed prior to executing the program module for registering the 3D reconstructions, said reconstruction point elimination module comprising executing the following sub-modules for each 3D reconstruction:

dividing a 3D space containing all the reconstruction points into voxels, each of which contains at least one of the reconstruction points;

selecting one of the voxels;

identifying a voxel neighborhood made up of the selected voxel and a prescribed number of voxels neighboring the selected voxel;

counting the total number of reconstruction points contained within all the voxels of the identified voxel neighborhood;

eliminating the reconstruction points contained in the selected voxel whenever the number of points counted in the associated voxel neighborhood does not exceed a prescribed threshold number; and selecting each remaining previously unselected voxel, in turn, and re-executing the identifying, counting and eliminating sub-modules for each newly selected voxel.

20. The computer-readable memory of claim 16, wherein the program module for extracting a surface representation of the object from the overall 3D reconstruction, comprises sub-modules for:

dividing a 3D space containing all the reconstruction points of the overall 3D reconstruction into voxels, each of which contains at least one reconstruction point;

selecting one of the voxels;

identifying a voxel neighborhood made up of the selected voxel and a prescribed number of voxels neighboring the selected voxel;

computing a plane for the selected voxel that best fits the reconstruction points contained within the identified voxel neighborhood;

selecting each remaining previously unselected voxel, in turn, and re-executing the identifying and computing sub-modules for each newly selected voxel; and extracting a triangular-mesh representation of the surface of the object being modeled based on the planes defined for each voxel.

21. The computer-readable memory of claim 20, wherein the sub-module for extracting a triangular-mesh representation of the surface of the object being modeled, comprises sub-modules for:

(a) selecting one of the voxels containing reconstruction points;

(b) computing the triangle-mesh representation of the portion of the object having a surface that is partially contained in the selected voxel using a marching cubes procedure while keeping track of each voxel processed via the procedure;

(c) determining whether there are any remaining unprocessed voxels containing reconstruction points;

(d) selecting one of any remaining unprocessed voxels containing reconstruction points; and (e) re-executing sub-modules (b) through (d) until there are no remaining unprocessed voxels containing reconstruction points.

* * * * *